US012302091B2

United States Patent
Muñoz De La Torre Alonso et al.

(10) Patent No.: US 12,302,091 B2
(45) Date of Patent: May 13, 2025

(54) METHODS AND NODES FOR DEACTIVATING SERVER NAME INDICATION, SNI, ENCRYPTION IN A TELECOMMUNICATION NETWORK

(71) Applicant: Telefonaktiebolaget LM Ericsson (publ), Stockholm (SE)

(72) Inventors: Miguel Angel Muñoz De La Torre Alonso, Madrid (ES); Maria Luisa Mas Rosique, Tres Cantos (ES); Marcus Ihlar, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 277 days.

(21) Appl. No.: 18/023,765

(22) PCT Filed: Jun. 2, 2021

(86) PCT No.: PCT/EP2021/064811
§ 371 (c)(1),
(2) Date: Feb. 28, 2023

(87) PCT Pub. No.: WO2022/048802
PCT Pub. Date: Mar. 10, 2022

(65) Prior Publication Data
US 2023/0328514 A1 Oct. 12, 2023

(30) Foreign Application Priority Data
Sep. 1, 2020 (EP) .................................... 20382775

(51) Int. Cl.
*H04W 12/033* (2021.01)
*H04L 61/4511* (2022.01)
*H04W 12/0431* (2021.01)

(52) U.S. Cl.
CPC ....... *H04W 12/033* (2021.01); *H04L 61/4511* (2022.05); *H04W 12/0431* (2021.01)

(58) Field of Classification Search
CPC ............ H04W 12/033; H04W 12/0431; H04L 61/4511; H04L 63/0407
See application file for complete search history.

(56) References Cited

U.S. PATENT DOCUMENTS 9,961,055 B1 * 5/2018 Johansson ............. H04L 9/3263
10,425,829 B1 * 9/2019 Cui ........................ H04W 16/14
(Continued)

OTHER PUBLICATIONS

Eastlake 3rd, D. "RFC 6066: Transport Layer Security (TLS) Extensions: Extension Definitions." (2011).*
(Continued)

*Primary Examiner* — Jimmy H Tran
(74) *Attorney, Agent, or Firm* — Sonoda & Kobayashi Intellectual Property Law; Sarvajit S. Patil

(57) ABSTRACT

A method for deactivating Server Name Indication, SNI, encryption in a telecommunication network, wherein said telecommunication network comprises a Domain Name System, DNS, server, said method comprising the steps of receiving, by said DNS server, from a User Equipment, UE, a DNS query comprising a Domain Name to be converted to an Internet Protocol, IP, address, determining, by said DNS server, that SNI encryption is to be deactivated for subsequent traffic associated with said Domain Name, forwarding, by said DNS server, said DNS query to an external DNS server, wherein said DNS query comprises said Domain Name and a request for deactivating SNI encryption, receiving, by said DNS server, from said external DNS server, a DNS answer, wherein said DNS answer comprises said converted IP address and wherein said DNS answer is free from encryption keys for encrypting SNI and forwarding, by said DNS server, said DNS answer comprising said con-
(Continued)

verted IP address to said UE, wherein said DNS answer is free from encryption keys such that said UE is not able to encrypt said SNI in said subsequent traffic.

12 Claims, 5 Drawing Sheets

(56) References Cited

U.S. PATENT DOCUMENTS

| | | | | |
|---|---|---|---|---|
| 2013/0312054 | A1* | 11/2013 | Wang | H04L 63/166 726/1 |
| 2014/0122865 | A1* | 5/2014 | Ovsiannikov | H04L 63/168 713/151 |
| 2014/0298415 | A1* | 10/2014 | Xie | H04L 61/2575 726/3 |
| 2016/0323201 | A1* | 11/2016 | Choen | H04L 65/80 |
| 2017/0223054 | A1* | 8/2017 | Wing | H04L 63/0281 |
| 2018/0198823 | A1* | 7/2018 | Johansson | H04L 63/06 |
| 2018/0262348 | A1* | 9/2018 | Golshan | H04L 9/0838 |
| 2019/0356693 | A1* | 11/2019 | Cahana | H04L 67/1036 |
| 2019/0387021 | A1* | 12/2019 | Wyatt | H04L 9/3265 |
| 2019/0394174 | A1* | 12/2019 | Sillankorva | H04L 9/0643 |
| 2020/0067954 | A1* | 2/2020 | Plonka | H04L 63/166 |
| 2020/0137093 | A1* | 4/2020 | Janakiraman | H04L 63/0263 |
| 2020/0137094 | A1* | 4/2020 | Janakiraman | G06N 20/00 |
| 2020/0153805 | A1* | 5/2020 | Sen | H04L 41/12 |
| 2020/0204519 | A1* | 6/2020 | Isaev | H04L 63/029 |
| 2020/0351251 | A1* | 11/2020 | Bhat | H04L 67/56 |
| 2021/0014328 | A1* | 1/2021 | Singhal | H04L 65/60 |
| 2021/0112040 | A1* | 4/2021 | Niemi | H04L 63/0485 |
| 2021/0160325 | A1* | 5/2021 | Lee | H04L 67/125 |
| 2021/0204152 | A1* | 7/2021 | Vasudevan | G06N 3/0475 |
| 2021/0234720 | A1* | 7/2021 | Shribman | H04L 69/16 |
| 2022/0021651 | A1* | 1/2022 | Moore | H04L 63/306 |
| 2022/0086691 | A1* | 3/2022 | Ihlar | H04W 28/10 |
| 2022/0129514 | A1* | 4/2022 | Shribman | G06F 9/547 |
| 2022/0129516 | A1* | 4/2022 | Shribman | H04L 1/00 |
| 2022/0173924 | A1* | 6/2022 | Shribman | H04L 67/563 |
| 2022/0353060 | A1* | 11/2022 | Saarnivala | H04L 9/12 |
| 2022/0360565 | A1* | 11/2022 | Shribman | H04L 67/56 |
| 2022/0368676 | A1* | 11/2022 | Shribman | H04L 67/56 |
| 2023/0093190 | A1* | 3/2023 | Ramachandran | H04L 67/141 709/223 |
| 2023/0308458 | A1* | 9/2023 | Varsanyi | H04L 63/0435 |
| 2023/0327997 | A1* | 10/2023 | Muñoz De La Torre Alonso | H04L 45/306 370/392 |
| 2023/0370423 | A1* | 11/2023 | Muñoz De La Torre Alonso | H04L 63/0236 |

OTHER PUBLICATIONS

Shbair, Wazen M., et al. "Efficiently bypassing SNI-based HTTPS filtering." 2015 IFIP/IEEE International Symposium on Integrated Network Management (IM). IEEE, 2015.*

Shbair, Wazen M., et al. "Improving SNI-based HTTPS security monitoring." 2016 IEEE 36th International Conference on Distributed Computing Systems Workshops (ICDCSW). IEEE, 2016.*

Keita, Khadidiatou Wane, et al. "Proposal for a new security association (SA) negotiation process in IPSec." 2019 International Conference on Advances in Big Data, Computing and Data Communication Systems (icABCD). IEEE, 2019.*

Vajaranta, Markku, Joona Kannisto, and Jarmo Harju. "IPsec and IKE as functions in SDN controlled network." Network and System Security: 11th International Conference, NSS 2017, Helsinki, Finland, Aug. 21-23, 2017, Proceedings 11. Springer International Publishing, 2017.*

Bhattacharjya, Aniruddha, et al. "CoAP—application layer connectionless lightweight protocol for the Internet of Things (IoT) and CoAP-IPSEC Security with DTLS Supporting CoAP." Digital twin technologies and smart cities (2020): 151-175.*

Ranjbar, Alireza, et al. "An SDN-based approach to enhance the end-to-end security: SSL/TLS case study." NOMS 2016-2016 IEEE/IFIP network operations and management symposium. IEEE, 2016.*

Kumar, Puneet, and Behnam Dezfouli. "Implementation and analysis of QUIC for MQTT." Computer Networks 150 (2019): 28-45.*

International Search Report and Written Opinion issued in International Application No. PCT/EP2021/064811 dated Sep. 1, 2021 (11 pages).

E. Rescorla et al., "Encrypted Server Name Indication for for TLS 1.3", tis Internet-Draft, Mar. 9, 2020 (pp. 1-27).

B. Schwartz et a., "Service binding and parameter specification via the DNS (DNS SVCB and HTTPS RRs)", DNSOP Working Group, Internet-Draft, Jul. 13, 2020 (pp. 1-42).

E. Rescorla et al., "TLS Encrypted Client Hello", tls, Internet-Draft, Jun. 1, 2020 (pp. 1-31).

3GPP TS 23.501 V16.5.0 (Jul. 2020), 3rd Generation Partnership Project; Technical Specification Group Services and System Aspects; System architecture for the 5G System (5GS); Stage 2 (Release 16), Jul. 2020 (441 pages).

J. Damas et al., "Extension Mechanisms for DNS (EDNS (0) )". Internet Engineering Task Force (IETF), Apr. 2013 (pp. 1-16).

E. Rescorla et al., "Encrypted Server Name Indication for TLS 1.3", tls, Internet-Draft, Jul. 8, 2019 (pp. 1-30).

* cited by examiner

METHODS AND NODES FOR DEACTIVATING SERVER NAME INDICATION, SNI, ENCRYPTION IN A TELECOMMUNICATION NETWORK

CROSS REFERENCE TO RELATED APPLICATIONS

This application is a 35 U.S.C. § 371 National Stage of International Patent Application No. PCT/EP2021/064811, filed 2021 Jun. 2, which claims priority to European Patent Application No. 20382775.3, filed on 2020 Sep. 1. The above identified applications are incorporated by this reference.

TECHNICAL FIELD

The present invention is related to the field of telecommunications and, more specifically, to a method for deactivating Server Name Indication, SNI, encryption in a telecommunication network.

BACKGROUND

Traffic encryption is growing significantly in mobile networks and at the same time, the encryption mechanisms are growing in complexity. The telecommunication network provider uses traffic filters, which can for example be either locally configured or received from Content Provider/AF through Nnef interface, to detect traffic and apply the corresponding management/enforcement actions like charging, Quality of Service, QoS, etc.

According to the state of the art, the information that a Content provider can communicate to the network operator so that the network operator is able to differentiate and classify the Content provider's traffic appropriately, is the information contained in the standardized Packet Flow Description, i.e. PFD. This is a set of information enabling the detection of application traffic including: PFD id; a 3-tuple, including protocol, server-side IP address and port number; or the parts of the Unified Resource Locator, URL, to be matched, e.g. host name; or a Domain name matching criteria, which refers to TLS protocol, specifically to for example TLS Client Hello Server Name Indication.

The TLS protocol specifies an extension known as Server Name Indication, SNI. It is common for content servers to host multiple origins behind a single Internet Protocol, IP, address. In order to route application flows to the correct server without having to decrypt the entire flow, the SNI extension was introduced.

The SNI extension is sent by the client, i.e. the User Equipment, UE, in the Client Hello message and contains a clear text string of the domain name of the server that the client is attempting to connect to. Since the SNI field is sent in clear text, it is commonly used by on-path network elements in order to classify flows.

At IETF, for TLS 1.3, it is proposed to encrypt the Server Name Indication, SNI, extension. Quick UDP Internet Connection, QUIC, is a UDP-based, stream-multiplexing, encrypted transport protocol. QUIC is basically a UDP based replacement for TCP. QUIC is currently under standardization at IETF and relies on TLS 1.3, so QUIC based applications may also have the Server Name Indication, SNI, extension encrypted.

As TLS 1.3 proposes to have the TLS SNI encrypted/obfuscated, with the current PFD rules as defined by 3GPP, it will be harder to differentiate traffic for both TLS (1.3 and beyond) and/or QUIC based applications, as SNI is commonly used by on-path network elements in order to classify flows today. Only alternative mechanism are lists of IP addresses, but that has many drawbacks: it may be very hard to keep updated, implies exposing the OTT topology and exchanging much more information: IP address lists can be huge.

As no traffic differentiation will be possible in the above described scenario, this may result in relevant impact on existing network operator Traffic Management Use Cases, for example Sponsored Data, QoS, Traffic Optimization, etc., for both TLS (1.3 and beyond) and/or QUIC based applications.

SUMMARY

It would be advantages to achieve a method that enables the nodes in a telecommunication network to utilize the SNI present in messages originating from a User Equipment, UE.

In a first aspect of the present disclosure, there is presented a method for deactivating Server Name Indication, SNI, encryption in a telecommunication network, wherein said telecommunication network comprises a Domain Name System, DNS, server, said method comprising the steps of:
  receiving, by said DNS server, from a User Equipment, UE, a DNS query comprising a Domain Name to be converted to an Internet Protocol, IP, address;
  determining, by said DNS server, that SNI encryption is to be deactivated for subsequent traffic associated with said Domain Name;
  forwarding, by said DNS server, said DNS query to an external DNS server, wherein said DNS query comprises said Domain Name and a request for deactivating SNI encryption;
  receiving, by said DNS server, from said external DNS server, a DNS answer, wherein said DNS answer comprises said converted IP address and wherein said DNS answer is free from encryption keys for encrypting SNI;
  forwarding, by said DNS server, said DNS answer comprising said converted IP address to said UE, wherein said DNS answer is free from encryption keys such that said UE is not able to encrypt said SNI in said subsequent traffic.

The above has the advantage that subsequent traffic, i.e. application specific traffic, cannot be encrypted as the DNS answer does not provide for any encryption keys.

More specifically, the subsequent traffic may comprise the UE sending a client hello message to the IP address contained in the DNS answer, wherein the Server Name Indication, SNI, is not encrypted as the UE has not received the encryption keys for doing so.

This allows the network entities/nodes of the telecommunication network to actually use the SNI, as it is not encrypted, for classifying flows. More specifically, this allows the network entities/nodes to differentiate and classify the content provider's traffic appropriately.

It is noted that, in accordance with the present disclosure, the content provider associated with the Domain Name may have a service-level, SLA, agreement in place with the telecommunication network operator. The SLA agreement may dictate that the SNI encryption may be deactivated in that specific telecommunication network for, for example, a certain set of content provider applications.

The step of determining, as disclosed above, may then entail that the DNS server verifies that an SLA agreement is in place, and that the traffic for a certain application, i.e. Domain Name, is approved in such a way that the SNI may be left unencrypted.

Following the above, the present disclosure may be directed to the concept that whenever a particular UE opens a certain application, it may trigger a DNS query, including the corresponding Domain or FQDN, towards the network operator's DNS server. The DNS server may then check if there is an SLA agreement to deactivate SNI encryption for this application/Domain. If so, network operator's DNS server indicates to the next/external DNS server in the DNS hierarchy a request to deactivate SNI encryption. This request is then tackled by the external DNS server in an appropriate manner.

In an example, the step of determining further comprises:
transmitting, by said DNS server, to a Policy and Charging function entity, a user consent request for querying whether said UE has provided a consent for deactivating said SNI encryption;
receiving, by said DNS server, from said Policy and Charging function entity, a user consent response comprising an indication that said UE has provided said consent for deactivating said SNI encryption.

The inventors have found that it may not be sufficient to have an agreement in place between the content provider and the telecommunication network operator to determine whether the SNI may be left unencrypted. The present example described a method in which the DNS server requests whether the UE itself has also provided its consent for deactivating the SNI encryption. Such a request is sent to a Policy and Charging function entity.

The advantage of the above described example is that it allows the network operator to comply with the privacy requirements of the user, by allowing explicit consent from the user.

It is noted that the presented method may be operative in any telecommunication network, for example a 4G or a 5G telecommunication network. As such, the Policy and Charging function entity may be a 4G network entity like the Policy and Charging Rules Function, PCRF, which is the software node designated in real-time to determine policy rules in a multimedia network or may be a 5G network entity like the Policy Charging Function, Policy Charging Function, which governs the Control plane functions via Policy rules defined and User plane functions via Policy enforcement.

Here, the received DNS query and said transmitted user consent request may comprise an IP address of said UE for enabling said Policy and Charging function entity to determine whether said UE has provided said user consent.

The IP address of the UE may be a unique address for identifying the UE. The Policy and Charging function entity may maintain a lookup table comprising a plurality of IP addresses, wherein each IP address is associated with either a confirmation or a declination of the consent of the UE for deactivating SNI encryption.

In a further example, the step of forwarding said DNS query comprises:
forwarding, by said DNS server, said DNS query to an external DNS server, wherein said DNS query comprises an operator identification for identifying an operator of said telecommunication network thereby enabling said external DNS server to determine whether Server Name Indication, SNI, encryption may be deactivated for said operator.

The inventors have found that it may be beneficial to insert an operator identification in the DNS query for identifying, to the external DNS server, the operator of the telecommunication network. The external DNS server may use this information to determine whether it is allowed to deactivate, or disable, SNI encryption in the telecommunication network. The external DNS server may do this, for example, by checking whether an SLA is in place between either the content provider and the telecommunication operator or between the telecommunication operator and the external DNS server.

It is noted that, as an option, the operator identification may be encrypted using, for example, a certificate-based solution.

In a further example, the DNS answer is free from encryption keys being any of a public key corresponding to said Domain Name and an Encrypted server name indication, ESNI, key corresponding to said Domain Name.

In a second aspect of the present disclosure, there is presented a method for supporting of deactivating Server Name Indication, SNI, encryption in a telecommunication network, wherein said telecommunication network comprises a Domain Name System, DNS, server, and a Policy and Charging function entity, said method comprising the steps of:
receiving, by said Policy and Charging function entity, from said DNS server, a user consent request for querying whether said UE has provided a consent for deactivating said SNI encryption;
determining, by said Policy and Charging function entity that said UE has provided said consent for deactivating said SNI encryption;
transmitting, by said Policy and Charging function entity, to said DNS server, a user consent response comprising an indication that said UE has provided said consent for deactivating said SNI encryption.

It is noted that the advantages as explained within the context of the first aspect of the present disclosure are also applicable within the context of the second aspect of the present disclosure.

In an example, the received user consent request comprise an IP address of said UE, wherein said step of determining comprises:
determining that said UE has provided said consent based on said received IP address of said UE.

More specifically, the method may comprise the initial steps of:
transmitting, by said Policy and Charging function entity, to a Unified Data Repository, UDR, a Query Request message for retrieving policy data of said UE;
receiving, by said Policy and Charging function entity, from said Unified Data Repository, UDR, a Query Response message, wherein said Query Response message comprises said indication that said UE has provided said consent for deactivating said SNI encryption;
storing, by said Policy and Charging function entity, said received indication that said UE has provided said consent for deactivating said SNI encryption.

The inventors have found that the UDR is a converged repository of subscriber information and can be used to service a number of network functions. For example, the 5G UDM, Unified Data Management, can use the UDR to store and retrieve subscription data. Alternatively, the PCF, Policy Control Function, can use the UDR to store and retrieve policy related data.

The UDR may be node in the network where it is actually stored that the UE has provided its consent to deactivate SNI encryption. This particular piece of information may then be conveyed to the PCF, as disclosed in the example above, as the PCF may be involved, in the DNS query, as disclosed within the context of the first aspect of the present disclosure.

In a third aspect, there is provided a method for supporting of deactivating Server Name Indication, SNI, encryption in a telecommunication network, by an external Domain Name System, DNS, server in an Internet Protocol, IP, communication system, wherein said external DNS server is arranged to communicate with a DNS server in a telecommunication network, wherein said method comprises the steps of:

receiving, by said external DNS server, from said DNS server in said telecommunication network, a DNS query comprising a Domain Name to be converted to an Internet Protocol, IP, address, and comprising a request for deactivating SNI encryption;

converting, by said external DNS server, said Domain Name to said IP address;

determining, by said external DNS server, that said SNI encryption may be deactivated for said Domain Name;

transmitting, by said external DNS server, to said DNS server in said telecommunication network a DNS answer, wherein said DNS answer comprises said converted IP address and wherein said DNS answer is free from encryption keys for encrypting said SNI.

It is noted that the advantages as explained within the context of the first and second aspect of the present disclosure are also applicable within the context of the third aspect of the present disclosure.

In an example, the received DNS query comprises an operator identification for identifying an operator of said telecommunication network, and wherein said step of determining comprises:

determining that said SNI encryption may be deactivated for said Domain Name based on said operator identification.

In a fourth aspect, there is provided a Domain Name System, DNS, server arranged for operating in a telecommunication network and for deactivating Server Name Indication, SNI, encryption in said telecommunication network, receive equipment arranged for receiving, from a User Equipment, UE, a DNS query comprising a Domain Name to be converted to an Internet Protocol, IP, address;

process equipment arranged for determining that SNI encryption is to be deactivated for subsequent traffic associated with said Domain Name;

transmit equipment arranged for forwarding said DNS query to an external DNS server, wherein said DNS query comprises said Domain Name and a request for deactivating SNI encryption;

wherein said receive equipment is further arranged for receiving from said external DNS server, a DNS answer, wherein said DNS answer comprises said converted IP address and wherein said DNS answer is free from encryption keys for encrypting SNI;

wherein said transmit equipment is further arranged for forwarding said DNS answer comprising said converted IP address to said UE, wherein said DNS answer is free from encryption keys such that said UE is not able to encrypt said SNI in said subsequent traffic.

In an example hereof:

said transmit equipment is arranged for transmitting to a Policy and Charging function entity, a user consent request for querying whether said UE has provided a consent for deactivating said SNI encryption;

said receive equipment is arranged for receiving from said Policy and Charging function entity, a user consent response comprising an indication that said UE has provided said consent for deactivating said SNI encryption.

In a fifth aspect, there is provided a Policy and Charging function entity arranged for operating in a telecommunication network and for supporting of deactivating Server Name Indication, SNI, encryption in a telecommunication network, wherein said Policy and Charging function entity comprises:

receive equipment arranged for receiving, from said DNS server, a user consent request for querying whether said UE has provided a consent for deactivating said SNI encryption;

process equipment arranged for determining that said UE has provided said consent for deactivating said SNI encryption;

transmit equipment arranged for transmitting, to said DNS server, a user consent response comprising an indication that said UE has provided said consent for deactivating said SNI encryption.

In a sixth aspect, there is provided an external Domain Name System, DNS, server arranged for operating in an Internet Protocol, IP, communication system, and for supporting of deactivating Server Name Indication, SNI, encryption in a telecommunication network, wherein said external DNS server is arranged to communicate with a DNS server in a telecommunication network, wherein said external DNS server comprises:

receive equipment arranged for receiving, from said DNS server in said telecommunication network, a DNS query comprising a Domain Name to be converted to an Internet Protocol, IP, address, and comprising a request for deactivating SNI encryption;

process equipment arranged for converting said Domain Name to said IP address and for determining that said SNI encryption may be deactivated for said Domain Name;

transmit equipment arranged for transmitting, to said DNS server in said telecommunication network a DNS answer, wherein said DNS answer comprises said converted IP address and wherein said DNS answer is free from encryption keys for encrypting said SNI.

An external DNS server means that the DNS server is to be used outside the telecommunication network. The external DNS server is reachable from the telecommunication network but is not under control of the telecommunication network operator.

In a seventh aspect, there is provided a computer program product comprising a computer readable medium having instructions stored thereon which, when executed by an computing entity, cause said entity to perform a method in accordance with any of the previous examples.

DETAILED DESCRIPTION

The Invention according to the present disclosure is further elaborated with the help of diagrams that enable further understanding of the present disclosure. The illustrations are not limiting and are merely explanatory.

Figure 1:
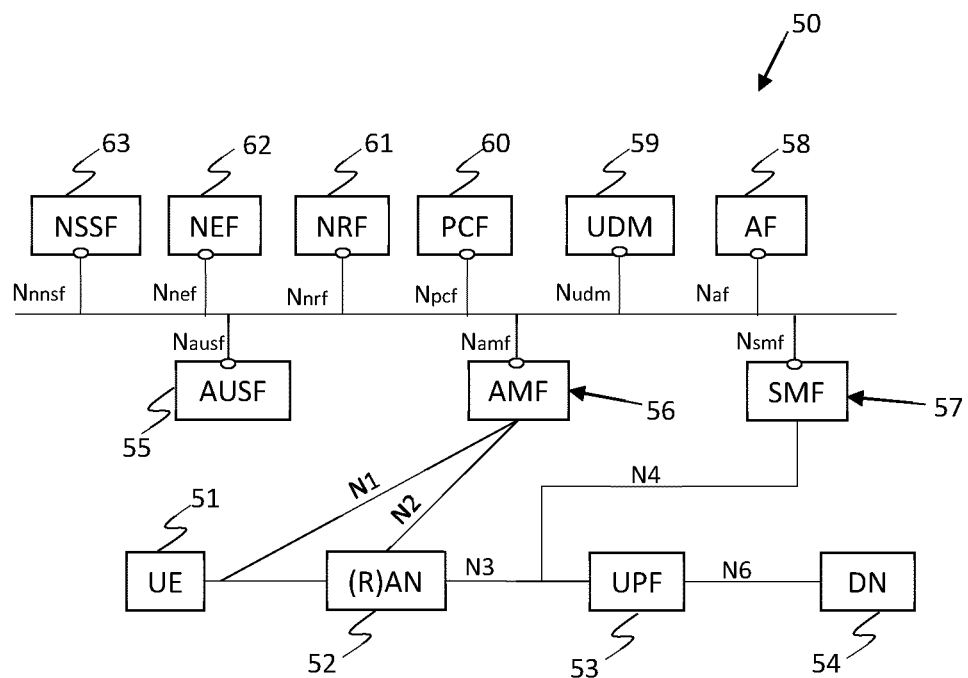
FIG. 1 schematically illustrates a part of the architecture of a Fifth Generation, 5G, telecommunication network.

FIG. 1 schematically illustrates a part of the architecture of a Fifth Generation, 5G, telecommunication network, 50. In FIG. 1, reference numeral 50 indicates a reference architecture for a 5G system. The 5G system architecture comprises the following Network Functions, NFs:
- Authentication Server Function, AUSF, 55
- Access and Mobility Management Function, AMF, 56
- Data network, DN, e.g. operator services, Internet access or third party services, 54
- Network Exposure Function, NEF, 62
- NF Repository Function, NRF, 61
- Policy Control Function, PCF, 60
- Session Management Function, SMF, 57
- Unified Data Management, UDM, 59
- User Plane Function, UPF, 53
- Application Function, AF, 58
- User Equipment, UE, 51
- Network Slice Selection Function, NSSF, 63.

The functional description of these network functions is specified in clause 6 of the 3GPP standard 23.501, "System Architecture for the 5G system", the contents of which are included herein, by reference.

It is further noted that the present disclosure is elaborated, in the following, with respect to a 5G telecommunication network. The present disclosure is, however, equally applicable to a 4G telecommunication network.

For example, the Policy Control Function, PCF, may be replaced by a Policy Control Rules Function, PCRF. The Session Management Function, SMF, may be replaced by any of a Packet Gateway Control plane function, PGW-C, or a Traffic Detection Function Control plane function, TDF-C. The User Plane Function, UPF, may be replaced by a PDN Gateway User plane function, PGW-U, or a Traffic Detection Function User plane function, TDF-U.

Figure 2:
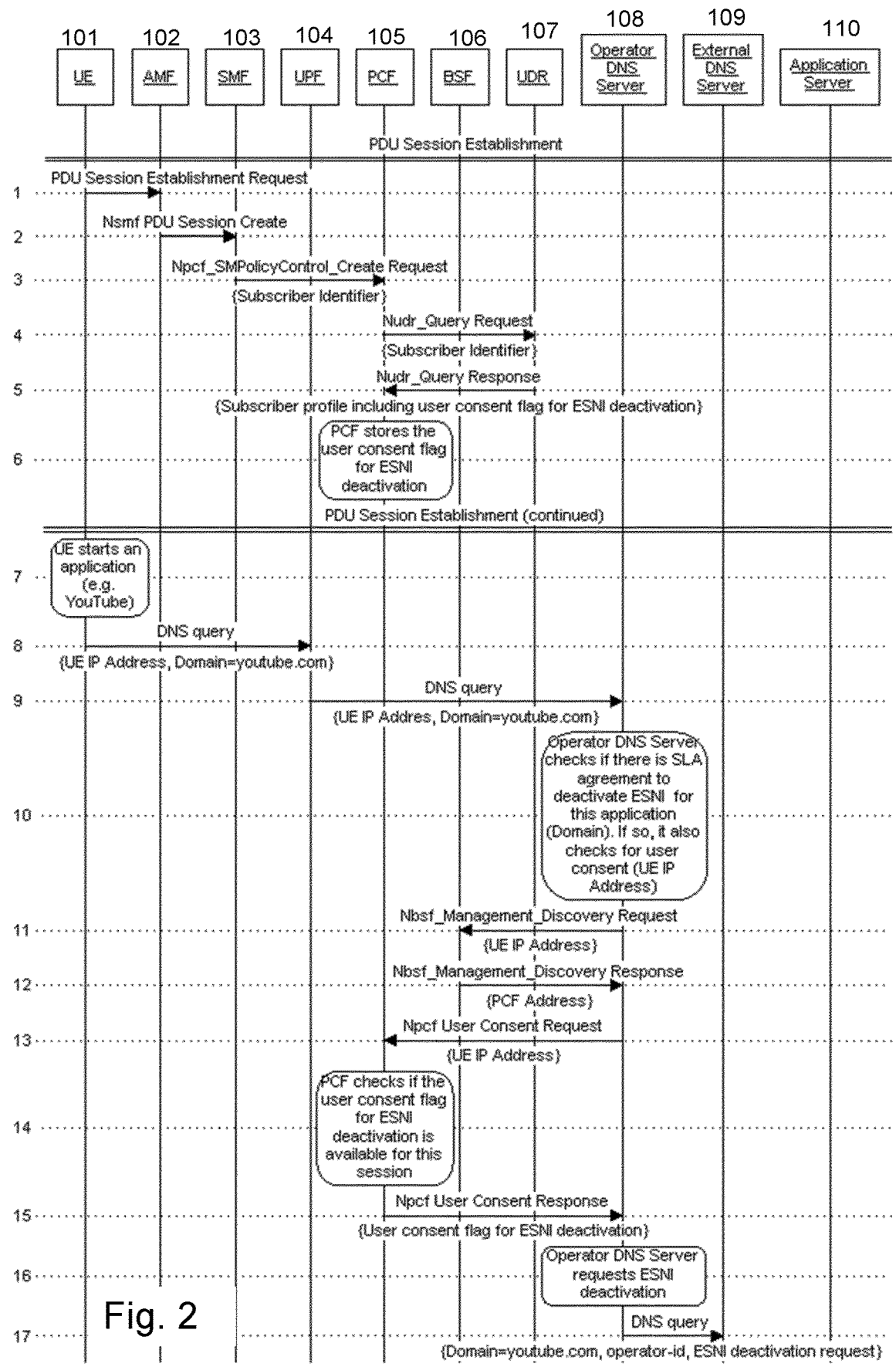
FIG. 2 schematically illustrates a flow charting illustrating a method according to the present disclosure.
Figure 2:
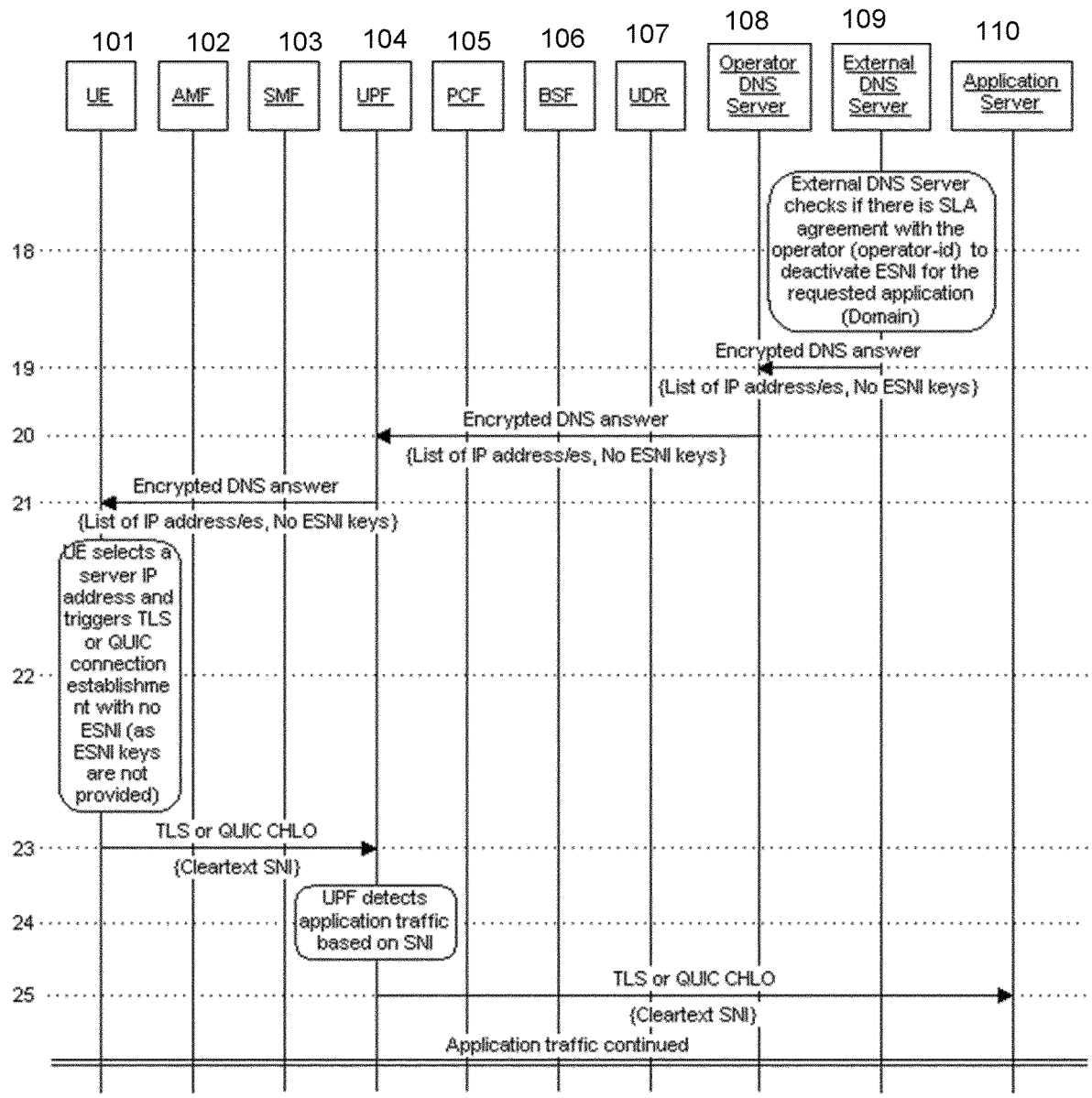

FIG. 2 schematically illustrates a flow charting illustrating a method according to the present disclosure.

The flow chart as shown in FIG. 2 may have certain preconditions. First, the telecommunication network operator and the content provide may have an SLA agreement in place which consist of deactivating SNI encryption in that specific operator's telecommunication network for a certain set of content provider application.

Further, it may be assumed that the User Equipment, UE, of the telecommunication network may be pre-provisioned with the address of the DNS server of the telecommunication network.

Finally, as an optional procedure and to comply with any user privacy requirements, it may be assumed that the Unified Data Repository, UDR, is provisioned with Subscriber Policy Data including an indication that the UE has provided consent for deactivating SNI encryption. This may, for example, be a user content flag.

In steps 1) and 2), the UE 101 may trigger a PDU session establishment procedure, by means of transmitting a PDU session establishment request to the Access and Mobility Function, AMF, 102. The AMF 102 may select a Session Management Function, SMF, 103 to manage the PDU session. The AMF 102 may have a selection function that selects an SMF instance based on the available SMF instances obtained from NRF or based on the configured SMF information in the AMF 102. The AMF 102 may thus trigger Nsmf PDU Session Create.

It is noted that the flow chart given in FIG. 2 does not include all signalling messages involved in the PDU session establishment procedure. The steps that may be relevant for the present disclosure are described in the subsequent steps.

In step 3), the SMF 103 may trigger Npcf_SMPolicyControl_Create Request message to retrieve SM policies for the user PDU session.

In step 4), the PCF 105 may trigger Nudr_Query Request message including the subscriber (UE) identifier to retrieve the policy data for this subscriber's PDU session.

In steps 5 and 6), the UDR 107 may answer to the PCF 105 with Nudr_Query Response message including the Subscriber Policy Data, which includes a user consent flag for ESNI deactivation, which is stored by PCF 105 for this session.

In steps 7 to 9), a subscriber starts an application so that the UE 101 triggers a DNS query towards the operator's network DNS server 108, including the UE IP Address, in the IP header, and the requested Domain or FQDN.

In step 10), the network operator's DNS Server 108 may check if there is an SLA agreement to deactivate ESNI for this specific application. If so, it checks for user consent, i.e. whether the user has provided its consent for deactivating the SNI encryption.

Steps 11 and 12 may be needed if there are more than one PCF in the network, that is:

In step 11), The network operator's DNS Server 108 triggers a Nbsf_Management_Discovery Request to discover the PCF 105 handling the user session, by including the UE IP Address.

In step 12), the BSF 106 answers to the network operator's DNS Server 108 with the PCF address.

In step 13), the network operator's DNS Server 108 triggers towards PCF 105 a Npcf User Consent Request message including the UE IP Address.

In steps 14 and 15), the PCF 105 checks if the user consent flag for ESNI deactivation is available for this session, i.e. UE IP Address, and if so, it answers network operator's DNS Server 108 with the User consent flag for ESNI deactivation.

In steps 16 and 17), the network operator's DNS server 108 indicates to the next, i.e. external DNS server in the DNS hierarchy a request to deactivate ESNI and also includes the network operator identifier, like the operator-id. There are different alternatives to do this, e.g. by proposing extensions to existing DNS protocol or by reusing existing extensions.

In addition to the above, different embodiments are possible depending on the DNS protocol stack:
- EDNS(0): A DNS extension is implemented to convey requests of this type. This would require standardization of the DNS extension.
- HTTP: When DNS over HTTPS is in use, the information can be exchanged using HTTP headers. This is likely a simpler option.

In an example, for security reasons and in order to avoid the operator to be impersonated, operator-id is encrypted and/or authenticated, e.g. using a certificate-based solution.

As an example, and in order to minimize impacts on the existing DNS protocol, it is possible to include the request to deactivate ESNI as part of the Domain/FQDN field, e.g.

Domain=youtube.com→No ESNI deactivation

Domain=youtube_nokeys.com→ESNI deactivation.

In steps 18 to 21), the external DNS Server 109 checks if there is an SLA agreement with this operator, i.e. operator-id, to deactivate ESNI for the requested application. If so, the DNS answer will not include the ESNI keys for the corresponding list of IP address/es.

In steps 22 and 23), the UE 101 selects a server IP address from the list and triggers TLS or QUIC connection establishment with (cleartext) SNI, as ESNI keys were not provided in Step 9 above.

In steps 24 and 25), the UPF 104 will be able to detect application's traffic based on the (cleartext) SNI and to apply the corresponding enforcement actions.

Figure 3:
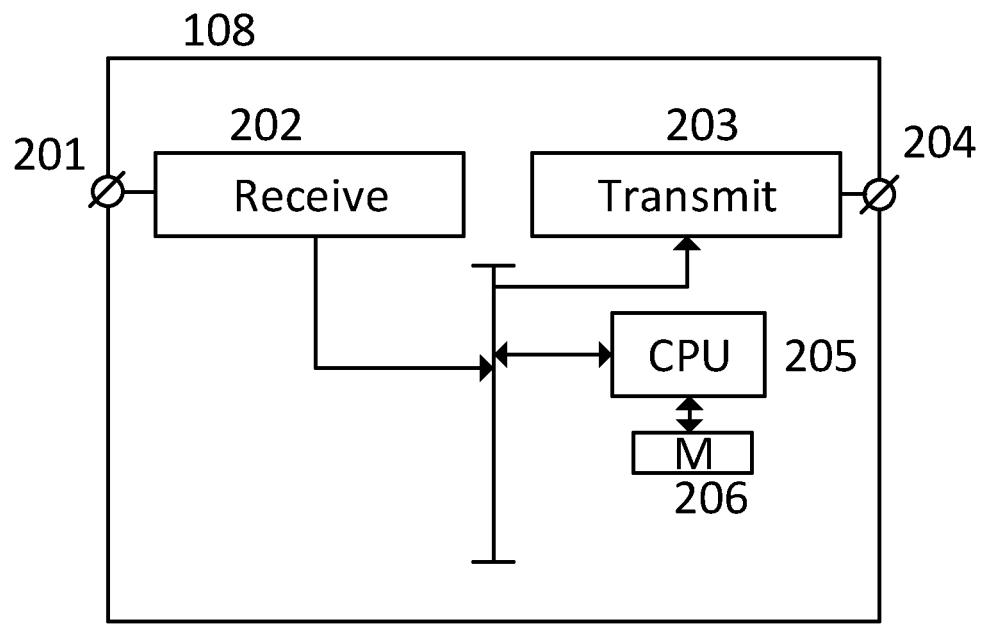
FIG. 3 schematically illustrates a block diagram of a Domain Name System, DNS, server in accordance with the present disclosure.

FIG. 3 schematically illustrates a block diagram of a Domain Name System, DNS, server 108 in accordance with the present disclosure.

The Domain Name System, DNS, server 108 is arranged for operating in a telecommunication network and for deactivating Server Name Indication, SNI, encryption in said telecommunication network.

The DNS server 108 comprises:
- receive equipment 202 arranged for receiving, via an input terminal 201, from a User Equipment, UE, a DNS query comprising a Domain Name to be converted to an Internet Protocol, IP, address;
- process equipment, 205, arranged for interfacing with a memory 206 and for determining that SNI encryption is to be deactivated for subsequent traffic associated with said Domain Name;
- transmit equipment 203 arranged for forwarding, via a transmit terminal 204, said DNS query to an external DNS server, wherein said DNS query comprises said Domain Name and a request for deactivating SNI encryption;
- wherein said receive equipment 202 is further arranged for receiving from said external DNS server, a DNS answer, wherein said DNS answer comprises said converted IP address and wherein said DNS answer is free from encryption keys for encrypting SNI;
- wherein said transmit equipment 203 is further arranged for forwarding said DNS answer comprising said converted IP address to said UE, wherein said DNS answer is free from encryption keys such that said UE is not able to encrypt said SNI in said subsequent traffic.

Figure 4:
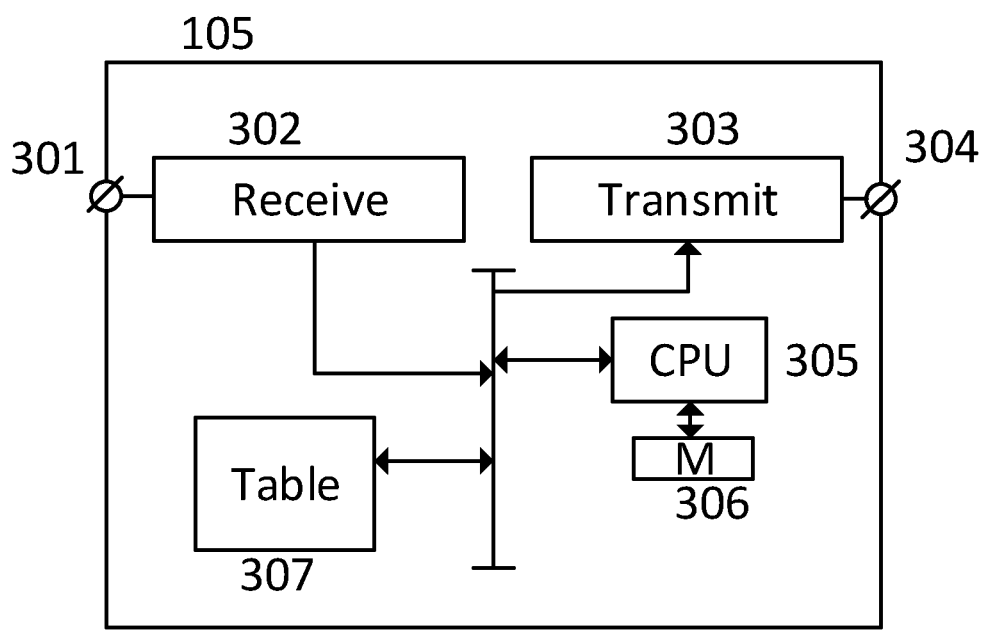
FIG. 4 schematically illustrates a block diagram of an external Domain Name System, DNS, server in accordance with the present disclosure.

FIG. 4 schematically illustrates a block diagram of a Policy and Charging function entity in accordance with the present disclosure.

The Policy and Charging function entity 105 is arranged for operating in a telecommunication network and for supporting of deactivating Server Name Indication, SNI, encryption in a telecommunication network, wherein said Policy and Charging function entity comprises:
- receive equipment 302 arranged for receiving, via an input terminal 301, from said DNS server, a user consent request for querying whether said UE has provided a consent for deactivating said SNI encryption;
- process equipment 305 arranged for interfacing with a memory 306 and for determining that said UE has provided said consent for deactivating said SNI encryption;
- transmit equipment 303 arranged for transmitting, via an output terminal 304, to said DNS server, a user consent response comprising an indication that said UE has provided said consent for deactivating said SNI encryption.

Here, the Policy and Charging function entity 105 may comprise a lookup table 307, which lookup table 307 comprises a list of UE IP addresses and a confirmation for each of these IP addresses whether or not the corresponding UE has provided its consent for deactivating SNI encryption.

Figure 5:
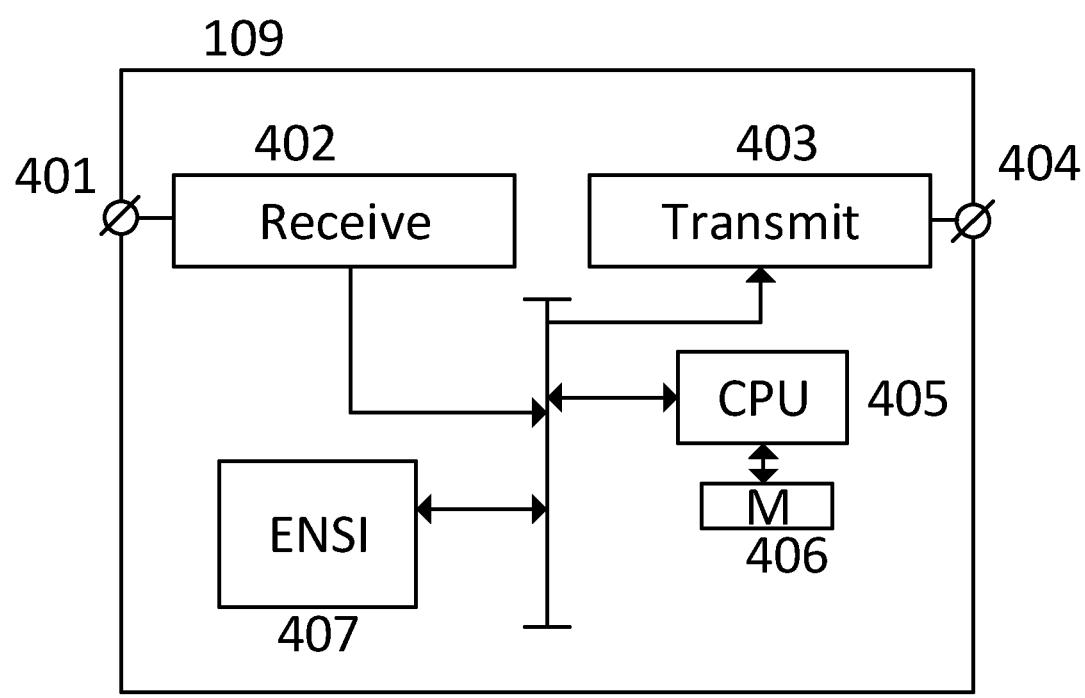
FIG. 5 schematically illustrates a block diagram of a Policy and Charging function entity in accordance with the present disclosure.

FIG. 5 schematically illustrates a block diagram of external DNS server in accordance with the present disclosure.

The external Domain Name System, DNS, server 109 is arranged for operating in an Internet Protocol, IP, communication system, and for supporting of deactivating Server Name Indication, SNI, encryption in a telecommunication network, wherein said external DNS server is arranged to communicate with a DNS server in a telecommunication network, wherein said external DNS server comprises:
- receive equipment 402 arranged for receiving, via an input terminal 401, from said DNS server in said telecommunication network, a DNS query comprising a Domain Name to be converted to an Internet Protocol, IP, address, and comprising a request for deactivating SNI encryption;
- process equipment 405 arranged for interfacing with a memory 406 and for converting said Domain Name to said IP address and for determining that said SNI encryption may be deactivated for said Domain Name;
- transmit equipment 403 arranged for transmitting, via an output terminal 404, to said DNS server in said telecommunication network a DNS answer, wherein said DNS answer comprises said converted IP address and wherein said DNS answer is free from encryption keys for encrypting said SNI.

Here, the external DNS server 109 may comprise a list of ENSI keys 407 that the external server may distribute in case there is no consent for deactivating any SNI encryption.

Following the present disclosure, there is provided, amongst other, a collaborative solution between any content provider and the telecommunication network operator to deactivate SNI encryption for a certain set of applications by using DNS procedures. The methods in accordance with the present disclosure still work even when the DNS traffic is encrypted.

Here below, certain examples of the present disclosure are summarized.

1. The telecommunication network operator and content provider may an SLA agreement which consists of deactivating SNI encryption in that specific Operator's telecommunication network for a certain set of content provider applications.
2. It may be assumed the subscribers, i.e. UE, of the telecommunication network operator are pre-provisioned with the address of the network operator's DNS server.
3. It may be assumed that UDR is provisioned with Subscriber Policy Data including a user consent flag for deactivating SNI encryption. That is, the UDR keeps track of whether the UE has provided its consent for deactivating SNI encryption using the user consent flag. This allows to comply with user privacy requirements.
4. Whenever a subscriber opens a certain application, it may trigger a DNS query towards the network operator's DNS server, which checks if there is an SLA agreement to deactivate SNI encryption for this application and for this subscriber. If so, network operator's DNS server indicates to the next external DNS server in the DNS hierarchy a request to deactivate SNI encryption and also includes the network operator identifier. As an option, in order to avoid the operator to be impersonated, the operator-id is encrypted, using a certificate-based solution.

5. The external DNS Server checks if there is an SLA agreement with the operator to deactivate SNI encryption for the requested application. If so, the DNS answer will not include the ESNI keys for the corresponding list of IP address/es.
6. The UE selects a server IP address from the list and triggers TLS or QUIC connection establishment with no ESNI (as ESNI keys were not provided).
7. The UPF will be able to detect application's traffic based on the (cleartext) SNI.

It is further noted that the above functionality can be enabled/disabled on a per subscriber basis, based on user consent.

The presented method has several advantages of the prior art.

It allows the network operator to provide the existing traffic management functionality to their subscribers when the traffic is encrypted, specifically when DNS traffic is also encrypted.

The proposed method allows the network operator to comply with the user's privacy requirements, by allowing explicit user consent.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method for deactivating Server Name Indication, SNI, (SNI) encryption in a telecommunication network, wherein the telecommunication network comprises a Domain Name System (DNS) server, the method comprising the steps of:
    receiving, by the DNS server, from a user equipment (UE) a DNS query comprising a Domain Name to be converted to an Internet Protocol (IP) address;
    determining, by the DNS server, that SNI encryption is to be deactivated for subsequent traffic associated with the Domain Name;
    forwarding, by the DNS server, the DNS query to an external DNS server, wherein the DNS query comprises the Domain Name and a request for deactivating SNI encryption;
    receiving, by the DNS server, from the external DNS server, a DNS answer, wherein the DNS answer comprises the converted IP address and wherein the DNS answer is free from encryption keys for encrypting SNI; and
    forwarding, by the DNS server, the DNS answer comprising the converted IP address to the UE, wherein the DNS answer is free from encryption keys such that the UE is not able to encrypt the SNI in the subsequent traffic.

2. The method of claim 1, wherein the step of determining further comprises:
    transmitting, by the DNS server, to a Policy and Charging function entity, a user consent request for querying whether the UE has provided a consent for deactivating the SNI encryption; and
    receiving, by the DNS server, from the Policy and Charging function entity, a user consent response comprising an indication that the UE has provided the consent for deactivating the SNI encryption.

3. The method of claim 2, wherein the received DNS query and the transmitted user consent request comprise an IP address of the UE for enabling the Policy and Charging function entity to determine whether the UE has provided the user consent.

4. The method of claim 1, wherein the step of forwarding the DNS query comprises:
    forwarding, by the DNS server, the DNS query to an external DNS server, wherein the DNS query comprises an operator identification for identifying an operator of the telecommunication network thereby enabling the external DNS server to determine whether Server Name Indication, SNI, (SNI) encryption may be deactivated for the operator.

5. The method of claim 1, wherein the DNS answer is free from encryption keys being any of a public key corresponding to the Domain Name and an Encrypted server name indication, ESNI, key corresponding to the Domain Name.

6. A method for supporting of deactivating Server Name Indication (SNI) encryption in a telecommunication network, wherein the telecommunication network comprises a Domain Name System (DNS) server, and a Policy and Charging function entity, the method comprising the steps of:
    receiving, by the Policy and Charging function entity, from the DNS server, a user consent request for querying whether the UE has provided a consent for deactivating the SNI encryption;
    determining, by the Policy and Charging function entity that the UE has provided the consent for deactivating the SNI encryption; and
    transmitting, by the Policy and Charging function entity, to the DNS server, a user consent response comprising an indication that the UE has provided the consent for deactivating the SNI encryption.

7. The method of claim 6, wherein the received user consent request comprise an IP address of the UE, wherein the step of determining comprises:
    determining that the UE has provided the consent based on the received IP address of the UE.

8. The method of claim 7, wherein the method comprises the initial steps of:
    transmitting, by the Policy and Charging function entity, to a Unified Data Repository, UDR, a Query Request message for retrieving policy data of the UE;

receiving, by the Policy and Charging function entity, from the Unified Data Repository, UDR, a Query Response message, wherein the Query Response message comprises the indication that the UE has provided the consent for deactivating the SNI encryption;

storing, by the Policy and Charging function entity, the received indication that the UE has provided the consent for deactivating the SNI encryption.

9. A method for supporting of deactivating Server Name Indication (SNI) encryption in a telecommunication network, by an external Domain Name System (DNS) server in an Internet Protocol (IP) communication system, wherein the external DNS server is arranged to communicate with a DNS server in a telecommunication network, wherein the method comprises the steps of:

receiving, by the external DNS server, from the DNS server in the telecommunication network, a DNS query comprising a Domain Name to be converted to an Internet Protocol (IP) address, and comprising a request for deactivating SNI encryption;

converting, by the external DNS server, the Domain Name to the IP address;

determining, by the external DNS server, that the SNI encryption may be deactivated for the Domain Name; and transmitting, by the external DNS server, to the DNS server in the telecommunication network a DNS answer, wherein the DNS answer comprises the converted IP address and wherein the DNS answer is free from encryption keys for encrypting the SNI.

10. The method of claim 9, wherein the received DNS query comprises an operator identification for identifying an operator of the telecommunication network, and wherein the step of determining comprises:

determining that the SNI encryption may be deactivated for the Domain Name based on the operator identification.

11. A Domain Name System (DNS) server arranged for operating in a telecommunication network and for deactivating Server Name Indication (SNI) encryption in the telecommunication network, receive equipment arranged for receiving, from a user equipment (UE) a DNS query comprising a Domain Name to be converted to an Internet Protocol (IP) address;

process equipment arranged for determining that SNI encryption is to be deactivated for subsequent traffic associated with the Domain Name;

transmit equipment arranged for forwarding the DNS query to an external DNS server, wherein the DNS query comprises the Domain Name and a request for deactivating SNI encryption;

wherein the receive equipment is further arranged for receiving from the external DNS server, a DNS answer, wherein the DNS answer comprises the converted IP address and wherein the DNS answer is free from encryption keys for encrypting SNI;

wherein the transmit equipment is further arranged for forwarding the DNS answer comprising the converted IP address to the UE, wherein the DNS answer is free from encryption keys such that the UE is not able to encrypt the SNI in the subsequent traffic.

12. The DNS server of claim 11, wherein:

said transmit equipment is arranged for transmitting to a Policy and Charging function entity, a user consent request for querying whether the UE has provided a consent for deactivating the SNI encryption;

said receive equipment is arranged for receiving from the Policy and Charging function entity, a user consent response comprising an indication that the UE has provided the consent for deactivating the SNI encryption.

* * * * *